US012763086B2

(12) United States Patent
Pan et al.

(10) Patent No.: US 12,763,086 B2
(45) Date of Patent: Oct. 13, 2026

(54) HIGH PRIVACY DSP-BASED AUDIO ANONYMIZATION WITH AUDIO SEGMENTATION AND RANDOMIZATION

(71) Applicant: HUAWEI TECHNOLOGIES CO., LTD., Shenzhen (CN)

(72) Inventors: Ting Pan, Waterloo (CA); Josip Tony Smolcic, Waterloo (CA); Zao Yang, Waterloo (CA); Tongyu Ge, Waterloo (CA); Jinxin Liu, Waterloo (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 206 days.

(21) Appl. No.: 18/747,173

(22) Filed: Jun. 18, 2024

(65) Prior Publication Data

US 2025/0384891 A1 Dec. 18, 2025

(51) Int. Cl.
*G10L 21/013* (2013.01)
*G10L 17/02* (2013.01)
*G10L 17/26* (2013.01)
*G10L 25/90* (2013.01)

(52) U.S. Cl.
CPC ............ *G10L 21/013* (2013.01); *G10L 17/02* (2013.01); *G10L 17/26* (2013.01); *G10L 25/90* (2013.01); *G10L 2021/0135* (2013.01)

(58) Field of Classification Search
CPC ....... G10L 21/013; G10L 17/02; G10L 17/26; G10L 25/90; G10L 2021/0135; G10L 17/00
See application file for complete search history.

(56) References Cited

U.S. PATENT DOCUMENTS

2004/0143434 A1* 7/2004 Divakaran .............. G10L 25/48 704/E11.002
2007/0198263 A1* 8/2007 Chen ..................... G10L 15/065 704/E15.009

(Continued)

OTHER PUBLICATIONS

Patino et al., "Speaker anonymisation using the McAdams coefficient", INTERSPEECH 2021, Sep. 1, 2021, retrieved from https://doi.org/10.48550/arXiv.2011.01130 on Apr. 8, 2024.

(Continued)

*Primary Examiner* — Athar N Pasha
(74) *Attorney, Agent, or Firm* — BCF LLP

(57) ABSTRACT

A method and an electronic device for generating an anonymized audio output are provided. The method, executable by the electronic device, comprises acquiring an audio recording of a speaker; stochastically determining a base pitch value based on at least a first probabilistic function; segmenting the original audio input into a plurality of audio segments, each of the plurality of audio segments being associated with a respective pitch. For each audio segment, the method further comprises generating a pitch adjustment value using a combination of the base pitch value of the segment and a value determined using a second probabilistic function; generating an adjusted audio segment by adjusting the pitch of the audio segment using the pitch adjustment value, the adjusted audio segment having an adjusted pitch that is different from the original pitch; generating the anonymized audio output by combining the adjusted audio segments.

20 Claims, 6 Drawing Sheets

(56) References Cited

U.S. PATENT DOCUMENTS

| | | | | |
|---|---|---|---|---|
| 2009/0144064 A1* | 6/2009 | Sakurai | G10L 21/04 | |
| | | | 704/503 | |
| 2011/0307260 A1* | 12/2011 | Zhang | G06F 3/017 | |
| | | | 715/764 | |
| 2021/0043222 A1* | 2/2021 | Li | G10L 25/63 | |
| 2024/0078339 A1* | 3/2024 | Suskind | H04N 7/147 | |
| 2025/0174214 A1* | 5/2025 | Zhang | G10H 1/0025 | |

OTHER PUBLICATIONS

Mawalim et al., "FO Modification via PV-TSM Algorithm for Speaker Anonymization Across Gender", Proceedings of 2022 APSIPA Annual Summit and Conference, Nov. 7-10, 2022, Chiang Mai, Thailand.

Mawalim et al., "Speaker Anonymization by Pitch Shifting Based on Time-Scale Modification", 2nd Symposium on Security and Privacy in Speech Communication, Sep. 23-24, 2022, Incheon, Korea.

* cited by examiner

HIGH PRIVACY DSP-BASED AUDIO ANONYMIZATION WITH AUDIO SEGMENTATION AND RANDOMIZATION

FIELD

The present technology is generally related to digital signal processing, and more specifically, to methods and processors designed to protect speakers' identities by modifying the voiceprint of audio recordings through segmentation and pitch randomization while minimizing the impact on usability.

BACKGROUND

With the advancement of machine learning and information technologies, intelligent systems are evolving at a fast pace. One of the features of these systems may include an intelligent voice assistant. However, maintain data privacy of voice data is also a major concern, as voiceprints can reveal sensitive information about a speaker (e.g. user).

At least some techniques have been developed to anonymize speakers' identities. A common technique in the industry is to convert audio data into text and only process the text data. This conversion process is called speech-to-text and it uses an Automatic Speech Recognition (ASR) model. The state-of-the-art ASR models consist of deep neural networks that consume a large amount of computing power. In contrast, the in-car ASR models usually have lower conversion accuracy as a trade-off for reducing hardware consumption and content usability. Moreover, converting audio data into text data loses additional information that audio data can provide. For example, one audio-related task is emotion recognition, which is impossible to do with text data only. Besides speech-to-text, other privacy preserving techniques that are commonly used in the industry include suppressing, encrypting or pseudonymizing the IDs that are associated with the audio data, or encrypting the audio signal directly. However, these techniques do not anonymize the data, but rather obfuscate it, and they have the possibility of being linked back or decrypted to the original data records. Therefore, there is a demand for audio anonymization techniques that can protect voiceprint privacy on edge devices, due to the limitations of existing audio privacy preserving technologies.

In audio anonymization the goal is to protect user privacy by removing identifying characteristics of audio recordings. In general, the Digital Signal Processing (DSP) based algorithm has lower privacy and utility compared with Machine Learning (ML) based algorithm. The ML based algorithms normally have better privacy and utility compared with DSP based algorithms, but due to the complexity of the algorithm, the size and latency is relatively large.

In an article entitled "*Speaker Anonymisation Using the McAdams Coefficient*", authored by Patino et al., and published at arxiv.org in September 2021, there is disclosed the McAdams coefficient-based approach for speaker anonymization. This method anonymizes the speech by adjusting the McAdams coefficient, which is a parameter that controls the frequency shift of the spectral envelope. The frequency shift is achieved by changing the angle of the complex poles derived from linear predictive coding, resulting in an expansion or contraction of the formant frequencies. This alters the audio timbre of the speech utterance and reduces the speaker-specific information based on different parameters selected.

In an article entitled "*F0 Modification via PV-TSM Algorithm for Speaker Anonymization Across Gender*", authored by Mawalim et al., and published at IEEE Xplore in December 2022, there is disclosed a DSP-based approach for speaker anonymization. This method manipulates the pitch of speech signals with time scale modification (TSM) techniques to suppress personally identifiable information (PII) while preserving linguistic content and voice quality. The pitch is shifted by random amount of semitones utilizing the gender information from the original speaker. Since the fundamental frequency is related to the pitch of the voice, which is one of the cues for gender perception, by changing the fundamental frequency of a speaker, this approach makes the speaker sound like of the opposite gender.

SUMMARY

Developers have devised methods and devices for overcoming at least some drawbacks present in prior art solutions.

Speaker (or user) anonymization is a challenging task that requires balancing privacy and utility. Privacy means how well the speaker's identity is protected, while utility means how well the speech content and quality are preserved. Developers of the present technology have designed a lightweight DSP-based audio anonymization algorithm that can prevent the speakers' voiceprint from exposing their identities with the minimal usability downgrade of the audio.

Unlike some solutions that perform formant shifting, at least some embodiments of the present technology may perform pitch shifting for anonymization, which maintains better audio utility. Unlike other solutions, some embodiments of the present technology involve using a base pitch generation with a probability to remove a determinacy of pitch selection from gender, which enhances the anonymized audio under a black box attack. Also, some embodiments of the present technology utilize segmentation-based pitch randomization to increase the recognition difficulties for an automatic speaker verification model which enhances the average Equal Error Rate (EER) over different attacking mechanisms. In comparison to some solutions, the privacy of the audio with or without the black box attack may be improved in at least some embodiments of the present technology while maintaining a similar utility level.

In at least some embodiments of the present technology, there is provided two preprocessing steps: a pitch value randomization step and audio signal segmentation with pitch shifting step. Such a framework may improve usability of a Word Error Rate (WER) value, privacy Equal Error Rate (EER) value with or without the black box attack for the anonymized audio.

In at least some embodiments of the present technology, there is provided a framework including three parts. Firstly, the original audio is provided to a base pitch parameter selection algorithm built upon the speaker classification module. This speaker classification module aims to boost the utility (e.g. WER). A probability-based gender flip decision module may be used for generating the base pitch for the second step. Then, the selected base pitch value and the original audio are passed into the segmentation-based pitch randomization algorithm, and a list of pitch values are generated for enhancing the privacy of the anonymized audio. Then, a list of pitch values is used for pitch shifting on the original audio to generate the anonymized audio.

In some embodiments, developers have devised methods that bridge the gap between audio privacy regulations and audio analysis application on edge devices with limited resources. It provides privacy protection by anonymizing audio with an improved averaged EER compared to current digital signal processing-based techniques while retaining the usability of the audio.

An application scenario of at least some embodiments of the present technology is an audio collecting service deployed on a car with an intelligent driving system that anonymizes customers' audios (e.g. voice) before uploading the audios to the cloud for any potential downstream tasks. Modules implemented in at least some embodiments of the present technology can be compiled into a software development kit (SDK) or shared library and deployed on the intelligent driving system as a service. Other audio related applications on the system could utilize the SDK for anonymizing the audios before uploading them to the cloud.

In the context of the present technology, Automatic Speech Recognition (ASR) refers to the use of machine learning models to generate textual representations of human speech from audio data. In some embodiments, ASR techniques may be used to evaluate a utility factor after the anonymization of a given audio segment.

In the context of the present technology, Automatic Speaker Verification (ASV) refers to the use of a user's voice for his/her authorization. This approach takes in two speech samples and measures the similarity between two speakers. In some embodiments, ASV may be used to evaluate a privacy factor after the anonymization of a given audio segment.

In the context of the present technology, Equal Error Rate (EER) is defined as the specific scenario at which the false acceptance rate and false rejection rate are equal. This scenario is also called the threshold for obtaining the similar equal error rate. The false acceptance rate and false rejection rate are obtained from the audio datasets given by ASV. In some embodiments, the EER value may be used to numerically evaluate privacy of the anonymization technique given its anonymized audio segments.

In the context of the present technology, Word Error Rate (WER) is defined as the differences resulted by substitution, deletion and insertion between the reference (ground truth) and the output of the system (e.g. ASR). WER is calculated as $$WER = \frac{S + D + I}{N} \times 100$$

where S is number of substitutions, D is number of deletions, I is number of insertions, and N is total number of words in the reference. In some embodiments, The WER value may be used to numerically evaluate utility of the anonymization technique given its anonymized audio segments.

In the context of the present technology, Time Scale Modification (TSM) refers to an algorithm that modifies the timing of a signal while maintaining its pitch value. The TSM-based pitch shifting can be further implemented by resampling the modified signals to its original time resulting in a pitch shift. There are two types of TSM methods: a time-domain based methods and a frequency-domain based methods. For example, an Overlap Add based method is a time-domain based method and a Phase Vocoder based method is a frequency-domain based method.

In the context of the present technology, Overlap Add (OLA) refers to a signal processing algorithm in which the signal is divided into overlapping segments, and processed separately. The processed overlapping segments are combined into original signal. The OLA based algorithm be computationally efficient for processing data in the time domain and preserving the naturalness of the audio segments regarding its formants. However, the OLA based algorithm may cause distortion on the periodic patterns.

In the context of the present technology, Phase Vocoder (PV) refers to a signal processing algorithm that analyzes the phase and manipulates the magnitude information of a signal in the frequency domain for time stretching and pitch shifting. In contrast to the OLA based method, the PV based method may preserve the periodicities of signal components. Both OLA-based and PV-based pitch shifting methods could be used in embodiments to anonymize the audios.

In the context of the present technology, a hyperparameter refers to a predefined configuration variable that influences the operation of the speaker anonymization system but is not modified during the system's learning process. Hyperparameters are set prior to the initiation of the model training and can affect the efficiency and effectiveness of the anonymization, such as the degree of pitch adjustment, segmentation size, or the specific probabilistic functions employed.

In at least one aspect of the present technology, there is provided a method for generating an anonymized audio output. The method is executable by a processor. The method comprises acquiring an original audio input, the original audio input being an audio recording of a speaker; stochastically determining a base pitch value based on at least a first probabilistic function; segmenting the original audio input into a plurality of audio segments, each of the plurality of audio segments being associated with a respective pitch. For a first audio segment from the plurality of audio segments, the method further comprises generating a first pitch adjustment value using a combination of a first value and the base pitch value, the first value being determined using a second probabilistic function; generating a first adjusted audio segment by adjusting a first pitch of the first audio segment using the first pitch adjustment value, the first adjusted audio segment having a first adjusted pitch that is different from the first pitch. The method further comprises generating the anonymized audio output using the first adjusted audio segment.

In some embodiments of the method, the method further comprises determining a gender of the speaker using the original audio input, and the stochastically determining a base pitch value is further based on the gender of the speaker.

In some embodiments of the method, for a second audio segment from the plurality of audio segments, the method further comprises generating a second pitch adjustment value using a combination of a second value and the base pitch value, the second value being different from the first value, the second pitch adjustment value being different from the first pitch adjustment value; generating a second adjusted audio segment by adjusting a second pitch of the second audio segment using the second pitch adjustment value, the second adjusted audio segment having a second adjusted pitch that is different from the second pitch. The generating the anonymized audio output further comprises using the second adjusted audio segment.

In some embodiments of the method, the method further comprises extracting a plurality of features from the original audio input using a feature extraction model, and wherein the determining the gender further comprises inputting the plurality of features into a gender classification model and outputting a gender class value by the gender classification model, the gender class value being indicative of the gender of the speaker in the original audio input.

In some embodiments of the method, the feature extraction model is at least one of: a Convolutional Neural Network (CNN), Recurrent Neural Networks (RNN), Gaussian Mixture Models (GMM).

In some embodiments of the method, the stochastically determining the base pitch value comprises utilizing a gender classification model to determine the gender of the given audio based on pitch value estimated from the speech signal; defining a probability threshold to introduce variability in pitch value selection, wherein for a detected gender, a random value is generated, and if the random value is greater than the defined probability threshold, a pitch value opposite to the typical pitch associated with the detected gender is selected for pitch shifting, and if the random value is less than or equal to the probability threshold, a pitch value typical for the detected gender is selected.

In some embodiments of the method, the segmenting the original audio input comprises employing a segmentation model to segment the original audio input into the plurality of audio segment, the segmentation model being at least one of: Hidden Markov Models (HMMs), and Gaussian Mixture Models (GMM).

In some embodiments of the method, the method further comprises generating the first value using the gender classification model based on the extracted pitch.

In some embodiments of the method, the method further comprises generating an other first adjusted audio segment using a time-scale modification based pitch shifting algorithm and the first adjusted audio segment; and generating the anonymized audio output using the other first adjusted audio segment.

In some embodiments of the method, the time-scale modification based pitch shifting algorithm is at least one of: Phase Vocoder (PV), Synchronous Overlap and Add (SOLA), Pitch-Synchronous Overlap and Add (PSOLA), and Waveform Similarity Overlap-Add (WSOLA).

In some embodiments of the method, the method further comprises triggering transmission, to a server over a communication network, of the anonymized audio output in lieu of the original audio input.

In at least one aspect of the present technology, there is provided an electronic device comprising a non-transitory computer-readable medium and a processor for generating an anonymized audio output, the non-transitory computer-readable medium comprising instructions, which upon being executed by the processor, configure the processor to acquire an original audio input, the original audio input being an audio recording of a speaker; stochastically determine a base pitch value based on at least a first probabilistic function; segment the original audio input into a plurality of audio segments, each of the plurality of audio segments being associated with a respective pitch; For a first audio segment from the plurality of audio segments, the processor is further configured to generate a first pitch adjustment value using a combination of a first value and the base pitch value, the first value being determined using a second probabilistic function; generate a first adjusted audio segment by adjusting a first pitch of the first audio segment using the first pitch adjustment value, the first adjusted audio segment having a first adjusted pitch that is different from the first pitch. The processor is further configured to generate the anonymized audio output using the first adjusted audio segment.

In some embodiments of the electronic device, the processor is further configured to determine a gender of the speaker using the original audio input, and the stochastically determining a base pitch value is further based on the gender of the speaker.

In some embodiments of the electronic device, for a second audio segment from the plurality of audio segments, the processor is further configured to generate a second pitch adjustment value using a combination of a second value and the base pitch value, the second value being different from the first value, the second pitch adjustment value being different from the first pitch adjustment value; generate a second adjusted audio segment by adjusting a second pitch of the second audio segment using the second pitch adjustment value, the second adjusted audio segment having a second adjusted pitch that is different from the second pitch. The generating the anonymized audio output further comprises using the second adjusted audio segment.

In some embodiments of the electronic device, the processor is further configured to extract a plurality of features from the original audio input using a feature extraction model, and wherein the determining the gender further comprises inputting the plurality of features into a gender classification model and outputting a gender class value by the gender classification model, the gender class value being indicative of the gender of the speaker in the original audio input.

In some embodiments of the electronic device, the feature extraction model is at least one of: a Convolutional Neural Network (CNN), Recurrent Neural Networks (RNN), Gaussian Mixture Models (GMM).

In some embodiments of the electronic device, the stochastically determining the base pitch value comprises utilizing a gender classification model to determine the gender of the given audio based on pitch value estimated from the speech signal; defining a probability threshold to introduce variability in pitch value selection, wherein for a detected gender, a random value is generated, and if the random value is greater than the defined probability threshold, a pitch value opposite to the typical pitch associated with the detected gender is selected for pitch shifting, and if the random value is less than or equal to the probability threshold, a pitch value typical for the detected gender is selected.

In some embodiments of the electronic device, the segmenting the original audio input comprises employing a segmentation model to segment the original audio input into the plurality of audio segment, the segmentation model being at least one of: Hidden Markov Models (HMMs), and Gaussian Mixture Models (GMM).

In some embodiments of the electronic device, the processor is further configured to generate the first value using the gender classification model based on the extracted pitch.

In some embodiments of the electronic device, the processor is further configured to generate an other first adjusted audio segment using a time-scale modification based pitch shifting algorithm and the first adjusted audio segment; and generate the anonymized audio output using the other first adjusted audio segment.

In some embodiments of the electronic device, the time-scale modification based pitch shifting algorithm is at least one of: Phase Vocoder (PV), Synchronous Overlap and Add (SOLA), Pitch-Synchronous Overlap and Add (PSOLA), and Waveform Similarity Overlap-Add (WSOLA).

In some embodiments of the electronic device, the processor is further configured to trigger transmission, to a server over a communication network, of the anonymized audio output in lieu of the original audio input.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers. It can be said that a database is a logically ordered collection of structured data kept electronically in a computer system.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
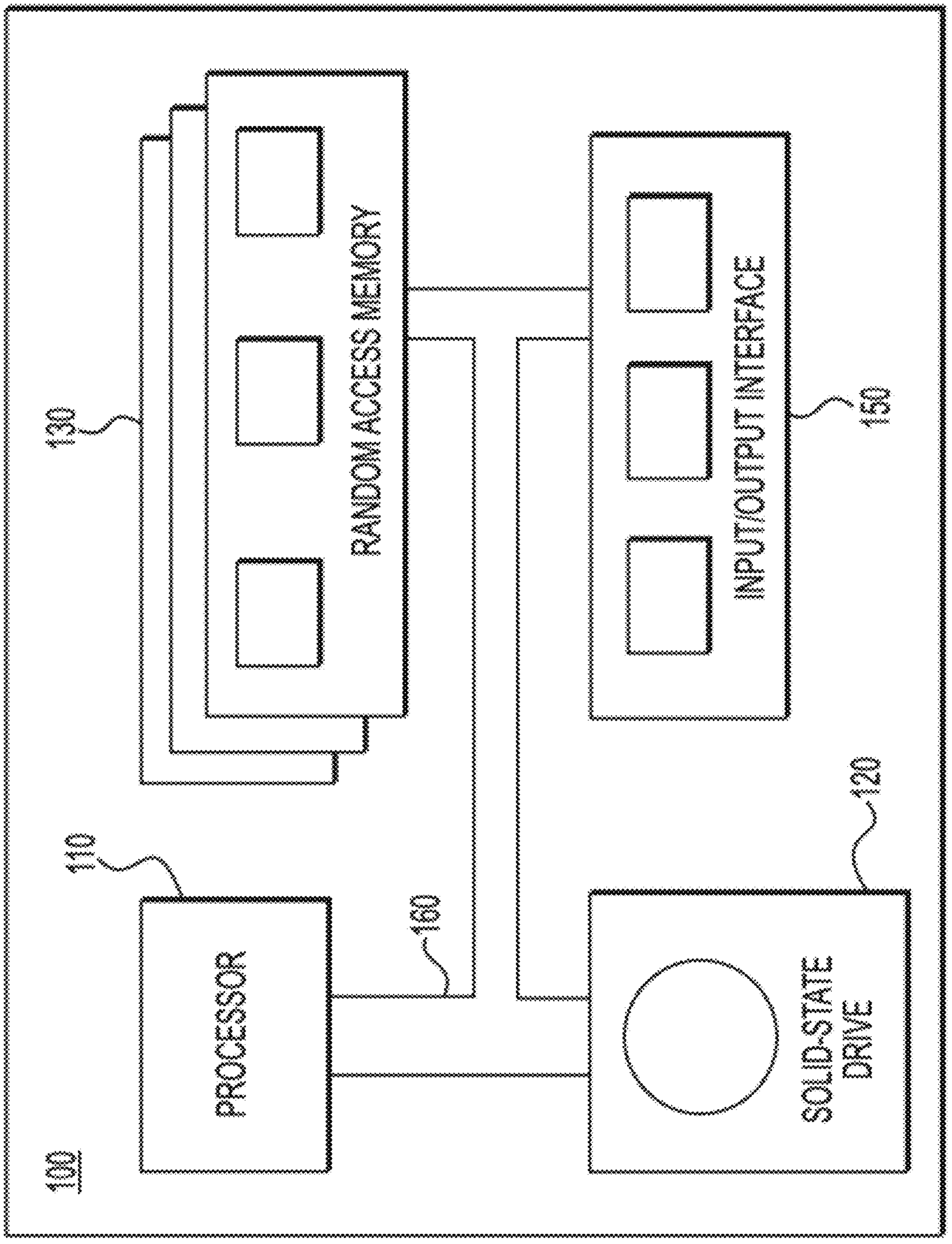
FIG. 1 illustrates an example of a computing device that may be used to implement any of the methods described herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

FIG. 1 illustrates a diagram of a computing environment 100 in accordance with an embodiment of the present technology is shown. In some embodiments, the computing environment 100 may be implemented by any of a conventional personal computer, a computer dedicated to operating and/or monitoring systems relating to a data center, a controller and/or an electronic device (such as, but not limited to, a mobile device, a tablet device, a server, a controller unit, a control device, a monitoring device etc.) and/or any combination thereof appropriate to the relevant task at hand. In some embodiments, the computing environment 100 comprises various hardware components including one or more single or multi-core processors collectively represented by a processor 110, a solid-state drive 120, a random access memory 130 and an input/output interface 150.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random access memory 130 and executed by the processor 110 for executing operating data centers based on a generated machine learning pipeline. For example, the program instructions may be part of a library or an application.

In some embodiments of the present technology, the computing environment 100 may be implemented as part of a cloud computing environment. Broadly, a cloud computing environment is a type of computing that relies on a network of remote servers hosted on the internet, for example, to store, manage, and process data, rather than a local server or personal computer. This type of computing allows users to access data and applications from remote locations, and provides a scalable, flexible, and cost-effective solution for data storage and computing. Cloud computing environments can be divided into three main categories: Infrastructure as a Service (IaaS), Platform as a Service (PaaS), and Software as a Service (SaaS). In an IaaS environment, users can rent virtual servers, storage, and other computing resources from a third-party provider, for example. In a PaaS environment, users have access to a platform for developing, running, and managing applications without having to manage the underlying infrastructure. In a SaaS environment, users can access pre-built software applications that are hosted by a third-party provider, for example. In summary, cloud computing environments offer a range of benefits, including cost savings, scalability, increased agility, and the ability to quickly deploy and manage applications.

Figure 2:
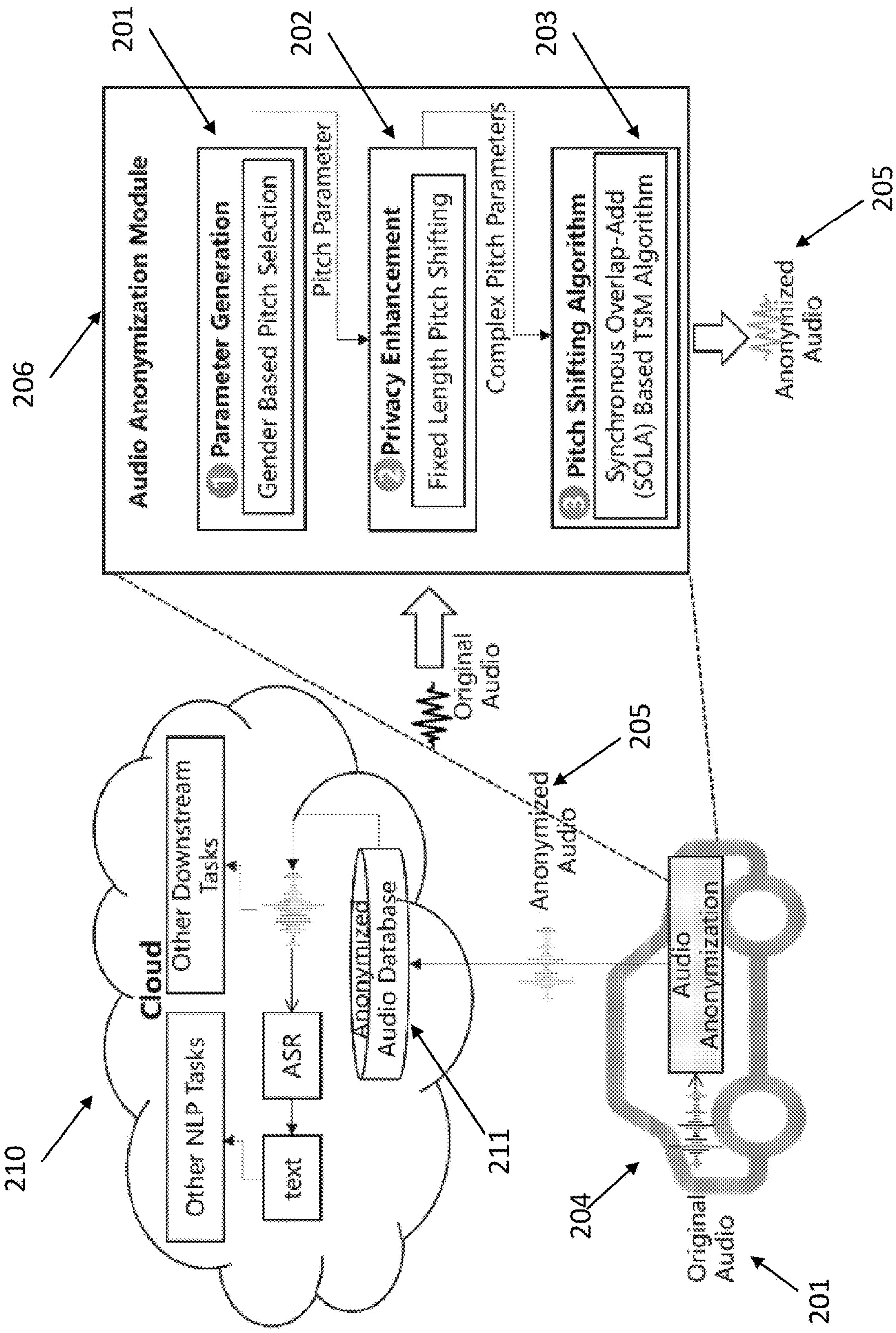
FIG. 2 discloses an application scenario, in accordance with at least some non-limiting embodiments of the present technology.

FIG. 2 discloses an application scenario, in accordance with at least some non-limiting embodiments of the present technology, that provides speech analytics service (e.g. emotion recognition, speech to text, spoken language understanding) with cloud server for a device. For example, the device may include various types of devices to which a user may interact with an assistant such as a mobile or user device, smart TV, home hub, in-car interaction device, etc. In order to maintain the privacy of the user, the device may utilize audio anonymization modules before sending audio to the cloud for further analysis. The process begins with the original audio 201 being captured as voice commands or conversation by the device. For example, the voice commands or conversation may be captured as part of a user interaction with a voice assistant. This original audio 201 is then processed by the audio anonymization module 206.

In some embodiments of the present technology, the audio anonymization module 206 comprises a parameter generation sub-module 202, which performs gender-based pitch selection. This step selects a pitch parameter that is used to alter the pitch of the original audio to a dynamically selected pitch that corresponds to a same or different gender.

In some embodiments of the present technology, the audio anonymization module 206 further comprises a privacy enhancement sub-module 203, which performs fixed length pitch shifting to generate complex pitch parameters. This manipulation of the audio ensures that the pitch is altered in such a way that the length of the audio signal is unchanged, but the voice's characteristics are sufficiently modified to prevent identification.

In some embodiments of the present technology, the audio anonymization module 206 further comprises a pitch shifting algorithm 203, which uses a Synchronous Overlap and Add (SOLA) based time scale modification (TSM) algorithm for changing the pitch of an audio signal without affecting its duration.

In some embodiments of the present technology, the anonymized audio output 205 generated by the audio anonymization module 206 may be uploaded to an anonymized audio database 211 in the cloud 210 for further processing. In the cloud, the audio can undergo various natural language processing (NLP) tasks and other downstream tasks. This may include automatic speech recognition (ASR) to convert the anonymized audio back into text, allowing for further processing without compromising the speaker's privacy.

Figure 3:
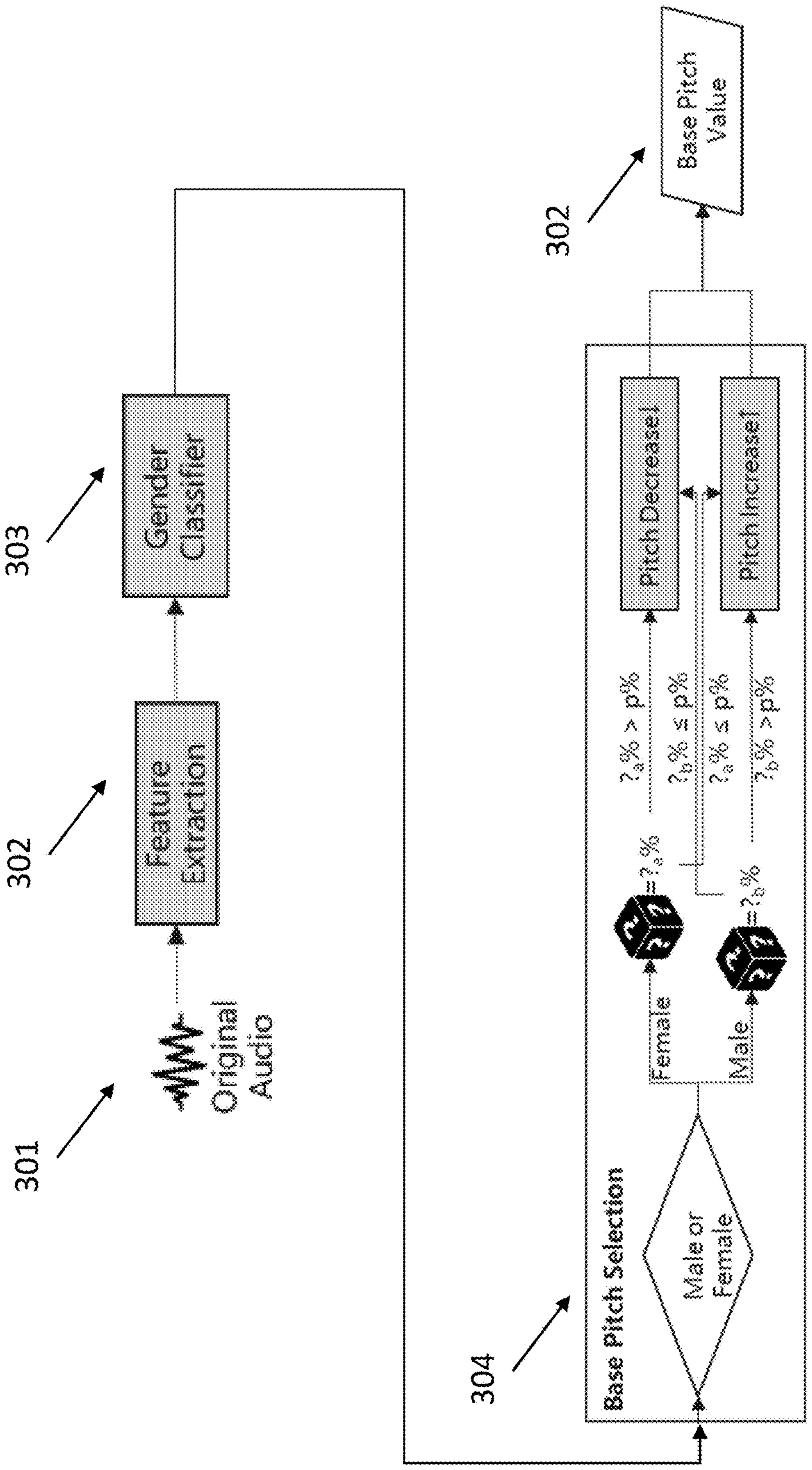
FIG. 3 discloses the concept of base pitch generation with probability, in accordance with at least some non-limiting embodiments of the present technology.

FIG. 3 discloses the concept of base pitch generation with probability, in accordance with at least some non-limiting embodiments of the present technology. For a given original audio 301, the processor 110 may select a single pitch value using the gender-based pitch parameter selection with probability such that the pitch parameter that provides the best privacy protection without destroying the speech usability is selected. Deciding the pitch parameter based on gender improves the usability of the anonymized audio. If the processor 110 scales up the pitch of a speaker's utterance to high, it becomes difficult to interpret. This is because the speaker's pitch may be high by default. Hence, scaling up the pitch makes the audio over-pitched, which decreases its interpretability (e.g. quantified as WER).

To prevent degradation of interpretability, the processor 110 includes a feature extraction module 302 which extracts the pitch of the audio signal. This is followed by a gender classification model 303 which predicts the gender of the given audio based on the extracted pitch.

In some embodiments of the present technology, the feature extraction module 302 extracts the pitch of the audio signal using the autocorrelation method. The autocorrelation method is a technique used in signal processing to analyze the properties of a speech signal, particularly for feature extraction such as pitch determination. This method works by comparing the speech signal with a delayed version of itself over various time lags and measuring the similarity between the signal at a given time and at a later time, thereby identifying periodicity or repetition within the signal. For pitch detection, autocorrelation is particularly effective because pitch periods in speech result in high autocorrelation values at the corresponding lags. The peak in the autocorrelation function, excluding the zero lag, indicates the pitch period of the speech signal. This method may be computationally lightweight since it is directly applied on the time-domain signals, and which can be employed in at least some embodiments for extracting pitch value for application like gender classification, and without departing from the scope of the present technology.

In some embodiments of the present technology, the gender classification model 303 predicts the gender of the given audio based on the extracted pitch using a pre-trained Gaussian mixture model (GMM). The Gaussian Mixture Model (GMM) is a probabilistic model that assumes all the data points are generated from a mixture of a finite number of Gaussian distributions with unknown parameters. GMMs are widely used in pattern recognition and machine learning for clustering and classification tasks, including voice gender classification. In the context of gender identification from speech signals, the GMM works by modeling the distribution of pitch values extracted from the speech as a mixture of multiple Gaussian distributions, each representing a gender category (typically male and female). The model is trained on a labeled dataset where the gender is known, allowing the GMM to learn the parameters of the Gaussians (mean, variance, and mixture coefficients) that best fit each gender category. For a new speech sample, the pre-trained GMM evaluates the likelihood of the extracted pitch value under each Gaussian distribution and assigns the gender based on the highest probability. This approach is flexible and capable of capturing the inherent variability in pitch across different speakers and genders, making it highly effective for gender classification in audio signals.

Following the gender classifier 303, the processor 110 includes a base pitch selection module 304 which adds a random shuffle to the original pitch. If the processor 110 simply introduces a contradictory pitch value based on detected gender instead of a random shuffle, the pitch values for different audios of the same person become deterministic and the attackers can easily apply the black box attack to de-anonymize a given audio using the algorithm used for anonymization. For example, the attacker uses the anonymizing algorithm to anonymize known reference audio and get the anonymized known reference audio. If the anonymized reference audio and unknown audio are from the same speaker, they would sound similar based on the same pitch value selected from the gender detection only.

To prevent the vulnerability arising from a "black box" attack, the processor 110 may be configured to employ a random shuffle after the gender classifier. First, the random shuffle operation may define a hyperparameter p being a probability of not flipping the gender. For example, a higher value of p may reduce utility but increases privacy; whereas a lower value of p may increase utility but lowers privacy.

This is a trade-off that users may be enabled to control based on specific use cases of the present technology.

If the gender detection result is female, the processor 110 generates a random number between 0 and 1. If the random number is greater than p, the processor 110 selects a lower pitch value in the base pitch selection module 304 for the pitch shifting algorithm. If the random number is less than or equal to p, the processor 110 selects a higher pitch value in the base pitch selection module 304 for the pitch shifting algorithm.

Similarly, if the gender detection result is male, the processor 110 generates a random number between 0 and 1. If the random number is greater than p, the processor 110 selects a higher pitch value in the base pitch selection module 304 for the pitch shifting algorithm. If the random number is less than or equal to p, the processor 110 selects a lower pitch value in the base pitch selection module 304 for the pitch shifting algorithm.

This prevents anonymized known and unknown audios from sounding similar under the black box attack and improves the privacy EER value. Therefore, the processor 110 selects the final base pitch value 302 with a certain probability determining whether or not to flip the gender.

Figure 4:
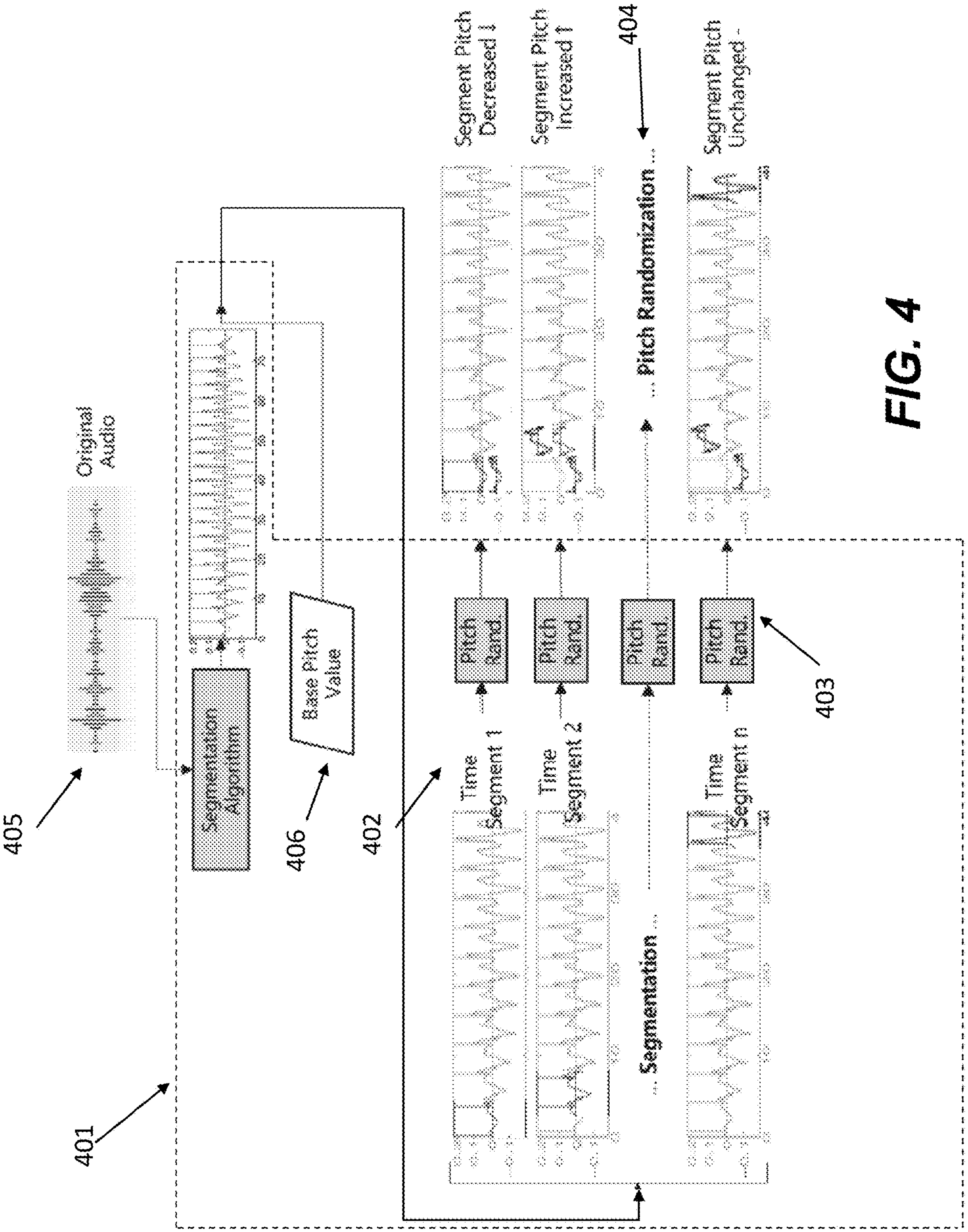
FIG. 4 discloses a segmentation-based pitch randomization module, in accordance with at least some non-limiting embodiments of the present technology.

In some embodiments of the present technology, the processor 110 may perform segmentation-based pitch randomization. For example, with reference to FIG. 4 there is depicted a segmentation-based pitch randomization module, in accordance with at least some non-limiting embodiments of the present technology. After selecting the base pitch parameter 406 from the base pitch selection module 304 as shown in FIG. 3, the anonymized audios are vulnerable to de-anonymization if the attacker can figure out the pitch parameter used in the base pitch selection module 304. To combat this potential risk, the processor 110 uses the segmentation-based pitch randomization module 401. This module breaks the speech signal into time segments based on a pre-defined logic.

In some embodiments of the present technology, it is contemplated that the pre-defined logic may be designed to break down the audio signal 405 (e.g. 10 seconds of audio) into multiple time segments 402 based on a fixed time duration (e.g. 2 seconds as a segment) or create a new segment if a silence is detected. For every speech segment, the processor 110 will randomly shift the base pitch coefficient up or down within a fixed pitch range. This fixed range is designed to ensure that the audio distortion due to pitch shifting does not impact the interpretability of the original audio. As a result, the segmentation-based pitch randomization module 402 provides a list of pitch values 403 randomly generated and increases the difficulties for the attackers in pairing the anonymized audios with their reference audios. This further enhances the privacy EER of the anonymized audio.

Next, the list of pitch values 403 will take effect on the audio segments 402 by a user-selected pitch-shifting algorithm 404. In some embodiments of the present technology, the pitch-shifting algorithm 404 is a digital signal processing technique which is an overlap-add (OLA) based algorithm. This approach seeks to optimize the intelligibility of the resulting audio while meeting the strict performance and memory requirements. Other potential pitch-shifting techniques are Phase Vocoder (PV), and Harmonic Percussive Separation (HPS).

Figure 5:
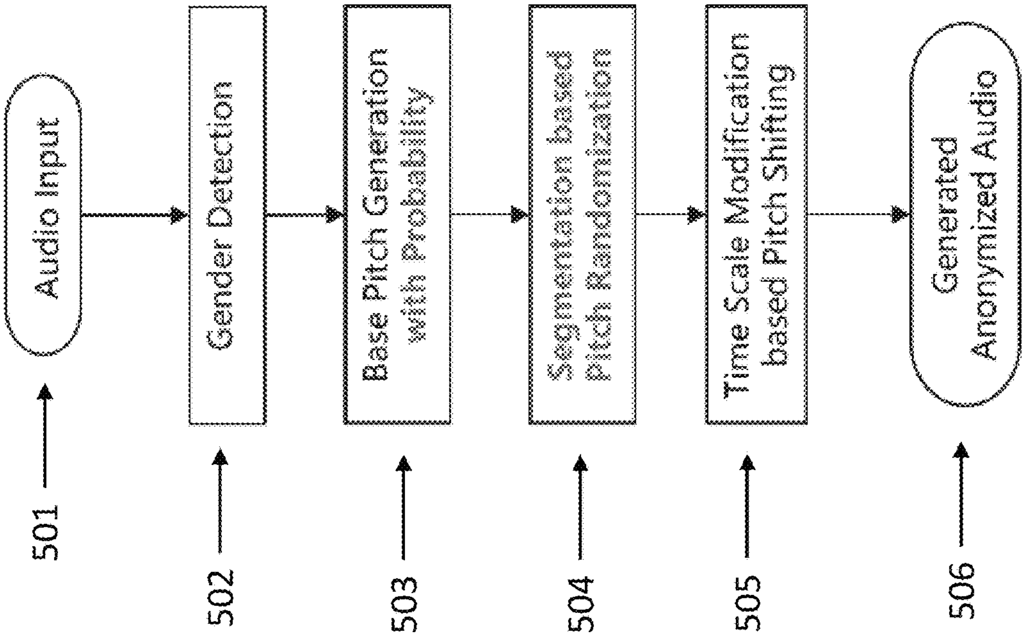
FIG. 5 discloses a summary of the broad steps performed by a processor, in accordance with at least some non-limiting embodiments of the present technology.

FIG. 5 discloses a summary of the broad steps performed by the processor 110, in accordance with at least some non-limiting embodiments of the present technology, to obtain the anonymized version of an original audio input. The process starts with the audio input 501 which is the raw data to be anonymized. The audio input goes through a gender detection step 502 to classify the speaker's gender. This step is crucial for determining the base pitch in the next stage. Once the gender is detected, a base pitch generation module generates a set of random base pitch values in step 503. This step involves a probability component to determine whether the pitch of the audio will be increased or decreased by the base pitch values. The stochastic nature of the step prevents deterministic outcomes that could be exploited through a black box attack. Next, in step 504, the audio is segmented, each of the of audio segment being associated with a respective pitch and within each segment, the pitch is randomized using a base pitch value generated in step 503. For implementing the pitch randomization, time scale modification based pitch shifting is used in step 505. This step ensures that even if an attacker can determine the base pitch, the randomization within segments creates a higher level of privacy. The final output is the anonymized audio 506. This audio has gone through pitch randomization to ensure that the speaker's identity is protected while retaining usability for downstream tasks.

Figure 6:
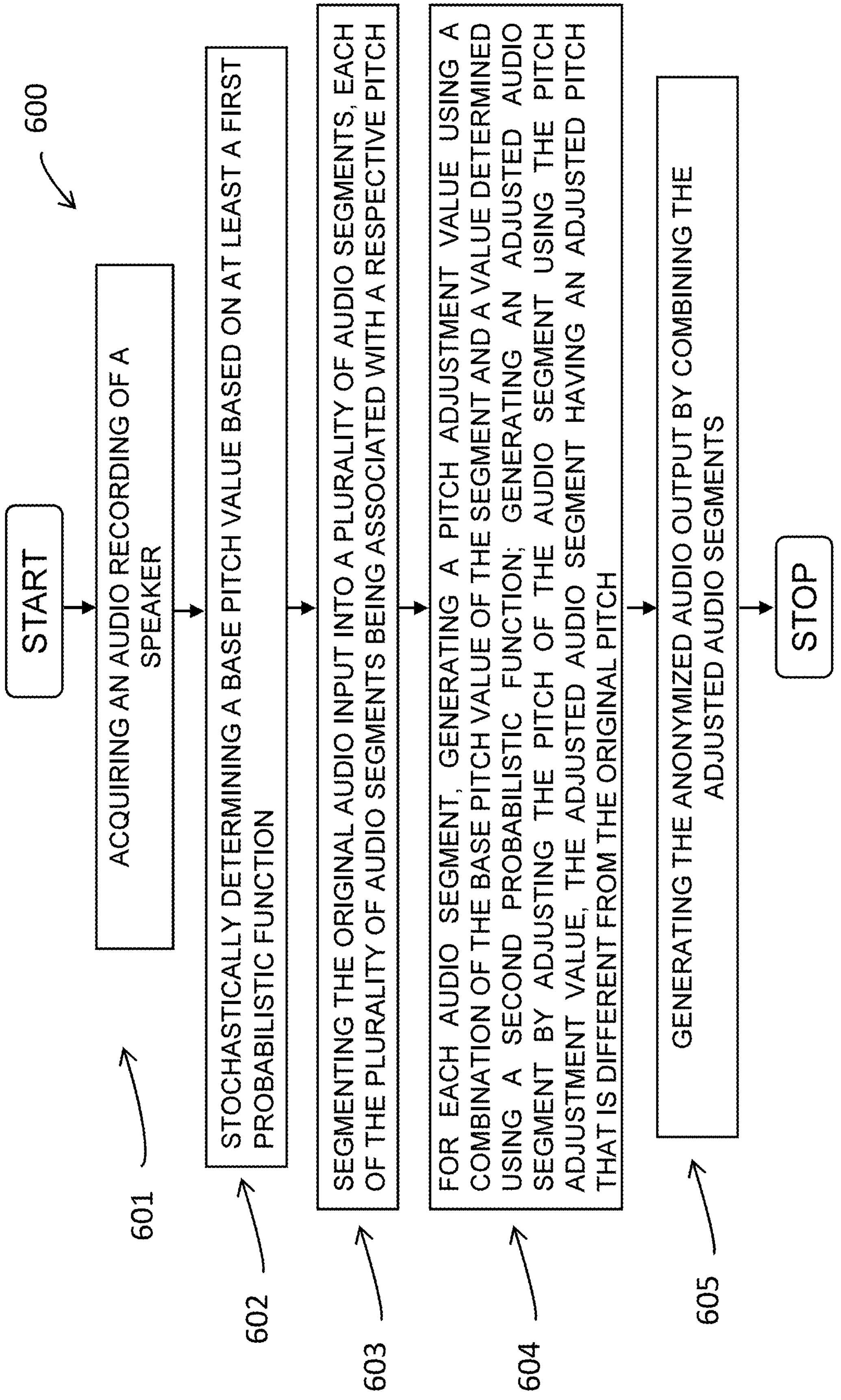
FIG. 6 is a scheme-block illustration of a method executed by a processor of the computing device of FIG. 1, in accordance with at least some non-limiting embodiments of the present technology.

FIG. 6 is a flow diagram of a method 600 executed by the processor 110, for generating an anonymized audio output, in accordance with at least some non-limiting embodiments of the present technology. In one or more aspects, the method 600 or one or more steps thereof may be performed by the processor 110 of the computer system 100. The method 600 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 600 begins at operation 601 with acquiring an audio recording of a speaker.

The method 600 continues, at operation 602, with stochastically determining a base pitch value based on the gender of the speaker and a first probabilistic function.

The method 600 continues, at operation 603, with segmenting the original audio input into a plurality of audio segments, each of the plurality of audio segments being associated with a respective pitch.

The method 600 continues, at operation 604, with generating a pitch adjustment value for each audio segment using a combination of the base pitch value of the segment and a value determined using a second probabilistic function; generating an adjusted audio segment by adjusting the pitch of the audio segment using the pitch adjustment value, the adjusted audio segment having an adjusted pitch that is different from the original pitch.

The method 600 ends, at operation 605, with generating the anonymized audio output by combining the adjusted audio segments.

It should be noted that although some embodiments described herein determine a gender of the speaker (e.g. male or female), other categorizations of the speaker are also contemplated that may include more than two groups and/or categorizations that may not be limited to gender (e.g. age, accent, etc.).

While the above-described implementations have been described and shown with reference to particular operations performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It will be appreciated that at least some of the operations of the method 600 may also be performed by computer programs, which may exist in a variety of forms, both active and inactive. Such as, the computer programs may exist as software program(s) comprised of program instructions in source code, object code, executable code or other formats. Any of the above may be embodied on a computer readable medium, which include storage devices and signals, in compressed or uncompressed form. Representative computer readable storage devices include conventional computer system RAM (random access memory), ROM (read only memory), EPROM (erasable, programmable ROM), EEPROM (electrically erasable, programmable ROM), and magnetic or optical disks or tapes. Representative computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of generating an anonymized audio output, the method executable by a processor, the method comprising:

acquiring an original audio input, the original audio input being an audio recording of a speaker;

stochastically determining a base pitch value based on at least a first probabilistic function;

segmenting the original audio input into a plurality of audio segments, each of the plurality of audio segments being associated with a respective pitch;

for a first audio segment from the plurality of audio segments:

generating a first pitch adjustment value using a combination of a first value and the base pitch value, the first value being determined using a second probabilistic function, wherein the first value comprises a random shift value that shifts the base pitch value up or down within a fixed pitch range for the first audio segment, the fixed pitch range being selected such that pitch-shifting distortion does not impact interpretability of the original audio;

generating a first adjusted audio segment by adjusting a first pitch of the first audio segment using the first pitch adjustment value, the first adjusted audio segment having a first adjusted pitch that is different from the first pitch;

generating the anonymized audio output using the first adjusted audio segment.

2. The method of claim 1, wherein the method further comprises:

determining a gender of the speaker using the original audio input; and wherein the stochastically determining a base pitch value is further based on the gender of the speaker.

3. The method of claim 1, wherein the method further comprises:

for a second audio segment from the plurality of audio segments:

generating a second pitch adjustment value using a combination of a second value and the base pitch value, the second value being different from the first value, the second pitch adjustment value being different from the first pitch adjustment value;

generating a second adjusted audio segment by adjusting a second pitch of the second audio segment using the second pitch adjustment value, the second adjusted audio segment having a second adjusted pitch that is different from the second pitch, wherein the second value comprises a second random shift value that shifts the base pitch value up or down within the fixed pitch range for the second audio segment;

and wherein the generating the anonymized audio output further comprises using the second adjusted audio segment.

4. The method of claim 2, wherein the method further comprises extracting a plurality of features from the original audio input using a feature extraction model, and wherein the determining the gender further comprises:

inputting the plurality of features into a gender classification model; and outputting a gender class value by the gender classification model, the gender class value being indicative of the gender of the speaker in the original audio input.

5. The method of claim 4, wherein the feature extraction model is at least one of: a Convolutional Neural Network (CNN), Recurrent Neural Networks (RNN), Gaussian Mixture Models (GMM).

6. The method of claim 1, wherein the segmenting the original audio input comprises:

employing a segmentation model to segment the original audio input into the plurality of audio segment, the segmentation model being at least one of: Hidden Markov Models (HMMs), and Gaussian Mixture Models (GMM).

7. The method of claim 4, wherein the method further comprises:

generating the first value using the gender classification model based on an extracted pitch.

8. The method of claim 1, wherein the method further comprises:

generating another first adjusted audio segment using a time-scale modification based pitch shifting algorithm and the first adjusted audio segment; and generating the anonymized audio output using the another first adjusted audio segment.

9. The method of claim 8, wherein the time-scale modification based pitch shifting algorithm is at least one of: Phase Vocoder (PV), Synchronous Overlap and Add (SOLA), Pitch-Synchronous Overlap and Add (PSOLA), and Waveform Similarity Overlap-Add (WSOLA).

10. The method of claim 1, wherein the method further comprises:

triggering transmission, to a server over a communication network, of the anonymized audio output in lieu of the original audio input.

11. An electronic device comprising a non-transitory computer-readable medium and a processor for generating an anonymized audio output, the non-transitory computer-readable medium comprising instructions, which upon being executed by the processor, configure the processor to:

acquire an original audio input, the original audio input being an audio recording of a speaker;

stochastically determine a base pitch value based on at least a first probabilistic function;

segment the original audio input into a plurality of audio segments, each of the plurality of audio segments being associated with a respective pitch;

for a first audio segment from the plurality of audio segments:

generate a first pitch adjustment value using a combination of a first value and the base pitch value, the first value being determined using a second probabilistic function, wherein the first value comprises a random shift value that shifts the base pitch value up or down within a fixed pitch range for the first audio segment, the fixed pitch range being selected such that pitch-shifting distortion does not impact interpretability of the original audio;

generate a first adjusted audio segment by adjusting a first pitch of the first audio segment using the first pitch adjustment value, the first adjusted audio segment having a first adjusted pitch that is different from the first pitch;

generate the anonymized audio output using the first adjusted audio segment.

12. The electronic device of claim 11, wherein the processor is further configured to:

determining a gender of the speaker using the original audio input; and wherein the stochastically determining a base pitch value is further based on the gender of the speaker.

13. The electronic device of claim 11, wherein the processor is further configured to:

for a second audio segment from the plurality of audio segments:

generate a second pitch adjustment value using a combination of a second value and the base pitch value, the second value being different from the first value, the second pitch adjustment value being different from the first pitch adjustment value, wherein the second value comprises a second random shift value that shifts the base pitch value up or down within the fixed pitch range for the second audio segment;

generate a second adjusted audio segment by adjusting a second pitch of the second audio segment using the second pitch adjustment value, the second adjusted audio segment having a second adjusted pitch that is different from the second pitch;

and wherein the generating the anonymized audio output further comprises using the second adjusted audio segment.

14. The electronic device of claim 12, wherein the processor is further configured to extract a plurality of features from the original audio input using a feature extraction model, and wherein the determining the gender further comprises:

inputting the plurality of features into a gender classification model;

outputting a gender class value by the gender classification model, the gender class value being indicative of the gender of the speaker in the original audio input.

15. The electronic device of claim 14, wherein the feature extraction model is at least one of: a Convolutional Neural Network (CNN), Recurrent Neural Networks (RNN), Gaussian Mixture Models (GMM).

16. The electronic device of claim 11, wherein the segmenting the original audio input comprises:

employing a segmentation model to segment the original audio input into the plurality of audio segment, the segmentation model being at least one of: Hidden Markov Models (HMMs), and Gaussian Mixture Models (GMM).

17. The electronic device of claim 14, wherein the processor is further configured to:

generate the first value using the gender classification model based on an extracted pitch.

18. The electronic device of claim 11, wherein the processor is further configured to:

generate another first adjusted audio segment using a time-scale modification based pitch shifting algorithm and the first adjusted audio segment; and generate the anonymized audio output using the another first adjusted audio segment.

19. The electronic device of claim 18, wherein the time-scale modification based pitch shifting algorithm is at least one of: Phase Vocoder (PV), Synchronous Overlap and Add (SOLA), Pitch-Synchronous Overlap and Add (PSOLA), and Waveform Similarity Overlap-Add (WSOLA).

20. The electronic device of claim 11, wherein the processor is further configured to:

trigger transmission, to a server over a communication network, of the anonymized audio output in lieu of the original audio input.

* * * * *